United States Patent
Chang et al.

(10) Patent No.: US 9,046,065 B2
(45) Date of Patent: Jun. 2, 2015

(54) VEHICLE AIR INTAKE MECHANISM

(71) Applicant: Kwang Yang Motor Co., Ltd., Kaohsiung (TW)

(72) Inventors: Chi-Han Chang, Kaohsiung (TW); Wen-Ming Su, Kaohsiung (TW); Ting-Yi Wang, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 2 days.

(21) Appl. No.: 13/660,665

(22) Filed: Oct. 25, 2012

(65) Prior Publication Data

US 2013/0104832 A1    May 2, 2013

(30) Foreign Application Priority Data

Nov. 1, 2011    (TW) .............................. 100220570 U

(51) Int. Cl.
*F02M 35/10*     (2006.01)
*F02M 35/16*     (2006.01)

(52) U.S. Cl.
CPC ... *F02M 35/10013* (2013.01); *F02M 35/10262* (2013.01); *F02M 35/162* (2013.01); *F02M 35/168* (2013.01); *Y02T 10/146* (2013.01)

(58) Field of Classification Search
USPC ........... 123/184.21, 198 E; 55/307, 309, 347, 55/413, 414, 415, 416, 434, 320, 332, 462, 55/465, 418, 441, 385.3; 180/68.1; 95/267, 272; 261/4, 5, 6, 7, 8
See application file for complete search history.

(56) References Cited

U.S. PATENT DOCUMENTS

| | | | |
|---|---|---|---|
| 6,564,766 B2 * | 5/2003 | Ayton | 123/184.21 |
| 7,641,720 B2 * | 1/2010 | Li | 96/108 |
| 2009/0308250 A1 * | 12/2009 | Rotter et al. | 95/268 |

* cited by examiner

*Primary Examiner* — Hung Q Nguyen
*Assistant Examiner* — Ruben Picon-Feliciano
(74) *Attorney, Agent, or Firm* — Fitzpatrick, Cella, Harper & Scinto

(57) ABSTRACT

A vehicle air intake mechanism comprises an air intake duct having an inlet end opening which opens in an axial direction, and a flow-guiding member having an outer surrounding wall that defines a flow channel in fluid communication with the inlet end opening. The outer surrounding wall has first and second end portions that extend in the axial direction. The first end portion of the outer surrounding wall surrounds an inlet end portion of the air intake duct. The first axial end of the outer surrounding wall defines a first end opening that is in fluid communication with the flow channel and that opens in the axial direction. The inlet end opening is disposed between and is spaced apart from first and second axial ends of the outer surrounding wall in the axial direction.

6 Claims, 9 Drawing Sheets

US 9,046,065 B2

VEHICLE AIR INTAKE MECHANISM

CROSS-REFERENCE TO RELATED APPLICATION

This application claims priority of Taiwanese Application No. 100220570, filed on Nov. 1, 2011.

BACKGROUND OF THE INVENTION

1. Field of the Invention

This invention relates to a vehicle air intake mechanism for a vehicle, more particularly to a vehicle air intake mechanism including a flow-guiding member for guiding environment air into an intake duct of an air filter.

2. Description of the Related Art

Four-wheel vehicles, such as All Terrain Vehicle (ATV) and Unmanned Vehicle (UV), can run on a rough road surface or on a gravel and dusty road, or travel across a shallow river. Hence, elimination of dust, dirt and water droplets from an environment air before inducing the environment air into the engine is very important to the service life of the engine. An air filter with an air intake duct is normally used for eliminating water droplets from the environment air induced into the air intake duct during actuation of the engine. In addition, the air intake duct is normally raised upright so that the inlet end of the air intake duct is positioned at a higher level and faces upwardly, thereby preventing water droplets from entering into the air intake duct.

FIG. 1 illustrates a conventional air intake mechanism 12 disclosed in Republic of China (Taiwanese) Patent No. I262988. The air intake mechanism 12 is secured to a frame tube of a shell body of a vehicle, and is connected to an air intake duct of an air filter 11. Since the air intake mechanism 12 has a structure that guides the induced environment air to flow along a linear flow path that extends to an inlet end of the air intake duct, water droplets carried by the flow of the environment air can directly and easily enter into the air intake duct of the air filter, which results in an adverse effect on the air filter and the engine.

SUMMARY OF THE INVENTION

Therefore, an object of the present invention is to provide a vehicle air intake mechanism that can overcome the aforesaid drawback associated with the prior art.

According to this invention, there is provided a vehicle air intake mechanism that is adapted to be connected to an air filter of a vehicle and that comprises: an air intake duct adapted to be connected to the air filter and having an inlet end portion that defines an inlet end opening which opens in an axial direction; and a flow-guiding member connected to the inlet end portion of the air intake duct and having an outer surrounding wall that defines a flow channel in fluid communication with the inlet end opening. The outer surrounding wall has first and second end portions that extend in the axial direction and that define first and second axial ends of the outer surrounding wall, respectively. The first end portion of the outer surrounding wall surrounds the inlet end portion of the air intake duct. The first axial end of the outer surrounding wall defines a first end opening that is in fluid communication with the flow channel and that opens in the axial direction. The inlet end opening is disposed between and is spaced apart from the first and second axial ends of the outer surrounding wall in the axial direction.

BRIEF DESCRIPTION OF THE DRAWINGS

In drawings which illustrate an embodiment of the invention.

DETAILED DESCRIPTION OF THE PREFERRED EMBODIMENT

Figure 1:
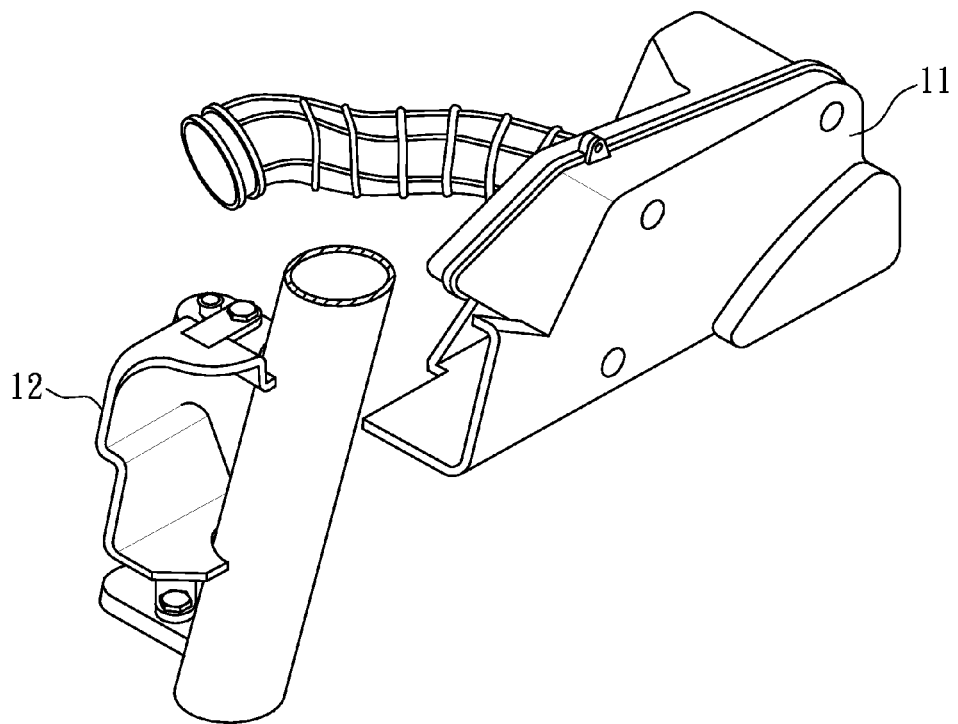
FIG. 1 is an exploded perspective view illustrating an assembly of a conventional air intake mechanism and an air filter.

FIGS. 2 to 6 illustrate the preferred embodiment of a vehicle air intake mechanism 3 adapted to be connected to an air filter 21 of a vehicle 2, such as a four-wheel car, according to the present invention. The vehicle 2 includes a shell body 20, the air filter 21, a fuel tank 25, an engine (not shown), a seat 26, and a pair of handles 27. The shell body 20 has a peripheral side wall 22, front and rear fender portions 23, 24 and left and right footrest portions 28 disposed below the front and rear fender portions 23, 24. The vehicle air intake mechanism 3 includes an air intake duct 31, a flow-guiding member 32, and first and second interlocking members 341, 342 (see FIG. 5).

The air intake duct 31 has an output end portion 311 connected to the air filter 21, and an inlet end portion 312 that is disposed opposite to the output end portion 311 and that defines an inlet end opening 310 which opens in an axial direction (X). The inlet end portion 312 of the air intake duct 31 has an axial end 315 and an end flange 313 (see FIG. 5) that extends radially and inwardly from the axial end 315 of the inlet end portion 312. The axial end 315 defines the inlet end opening 310.

Figure 2:
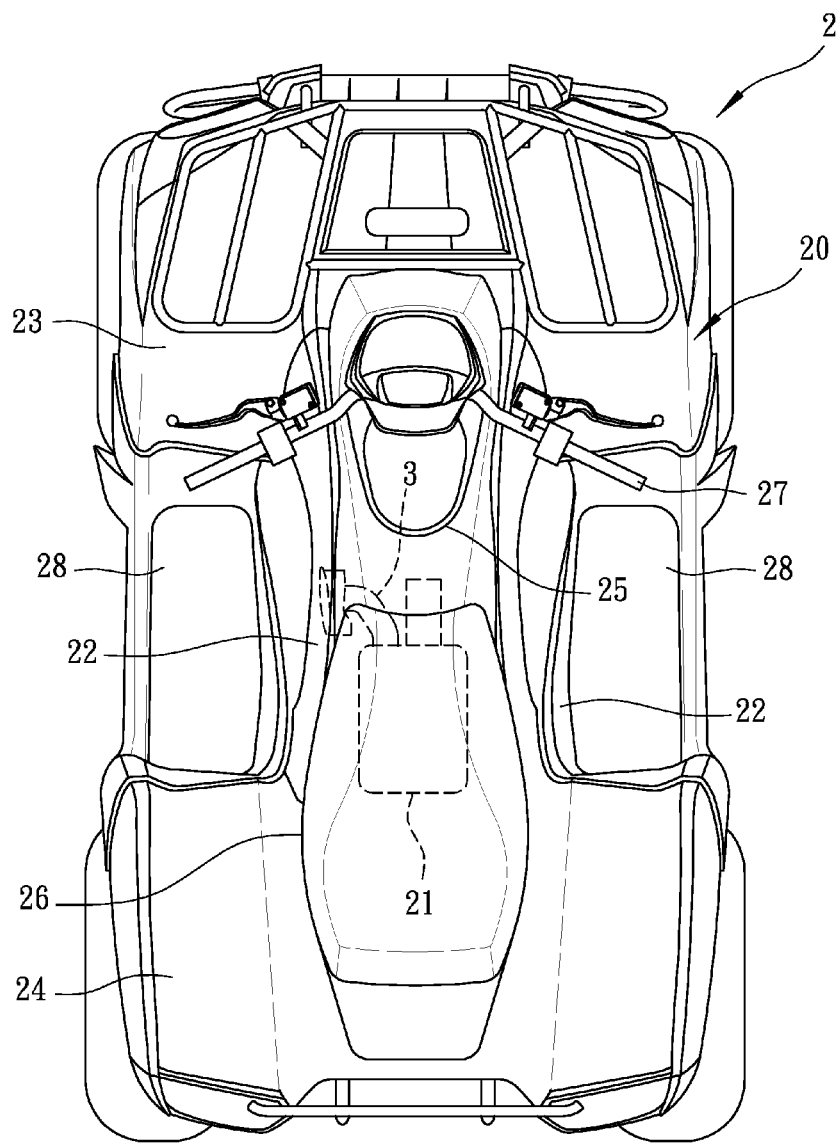
FIG. 2 is a top view of a vehicle provided with the preferred embodiment of a vehicle air intake mechanism according to the present invention.
Figure 3:
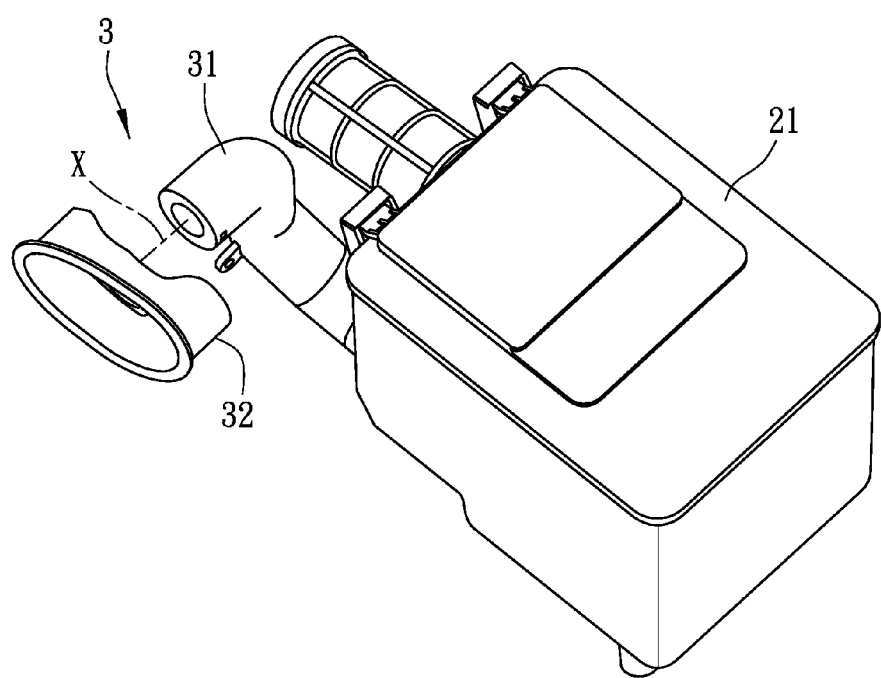
FIG. 3 is an exploded perspective view of an assembly of an air filter and the preferred embodiment.
Figure 4:
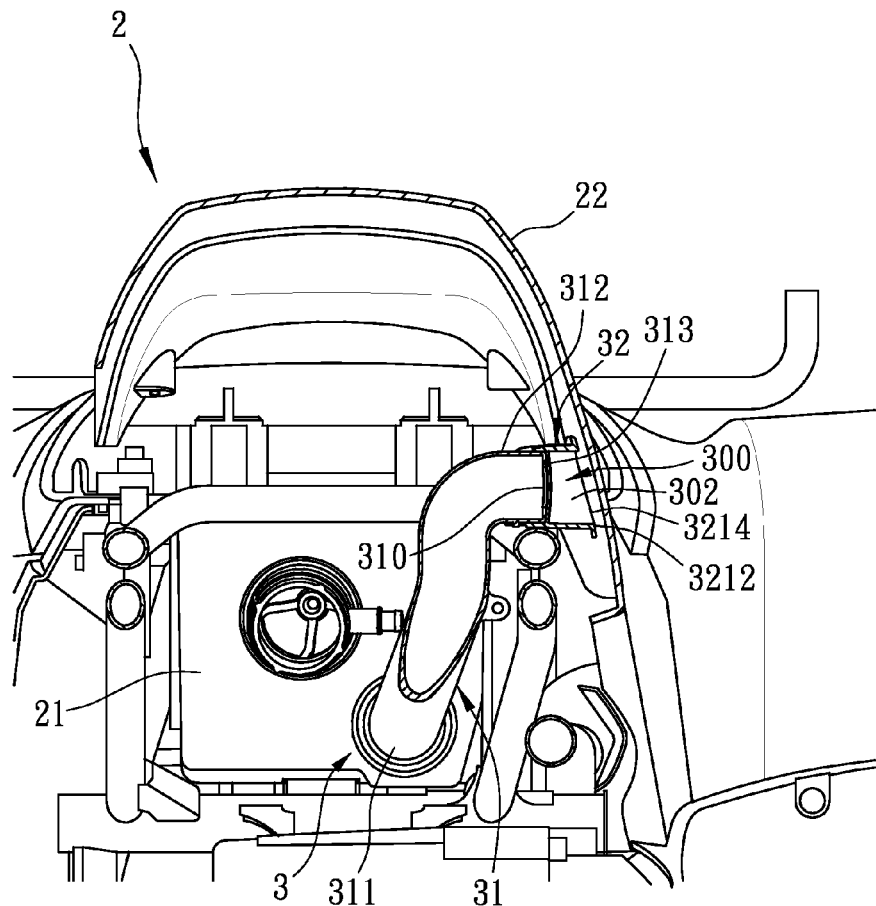
FIG. 4 is a fragmentary sectional view of the vehicle provided with the preferred embodiment.
Figure 5:
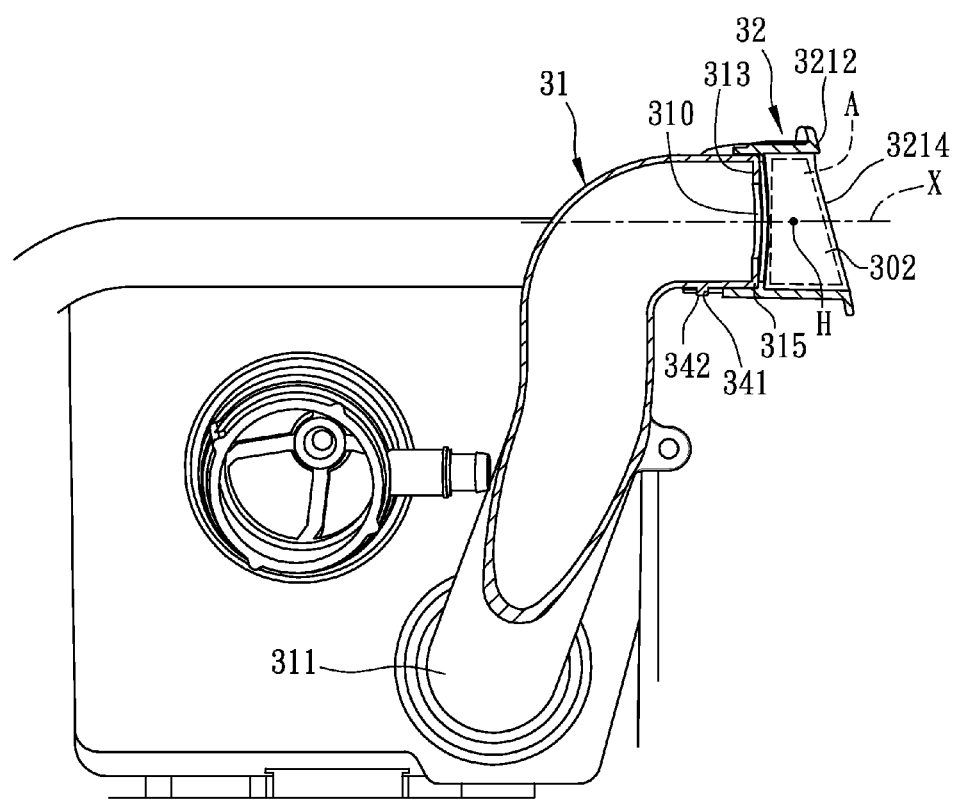
FIG. 5 is a fragmentary sectional view of the assembly of the air filter and the preferred embodiment.
Figure 6:
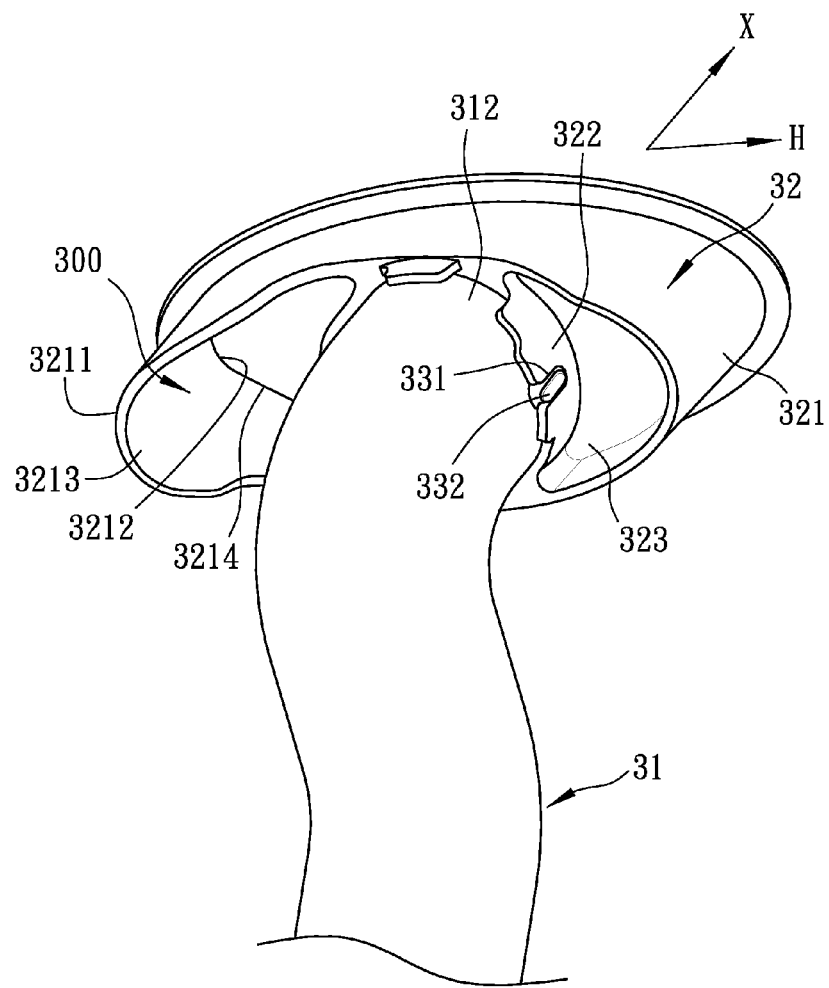
FIG. 6 is a fragmentary perspective view of the preferred embodiment.
Figure 7:
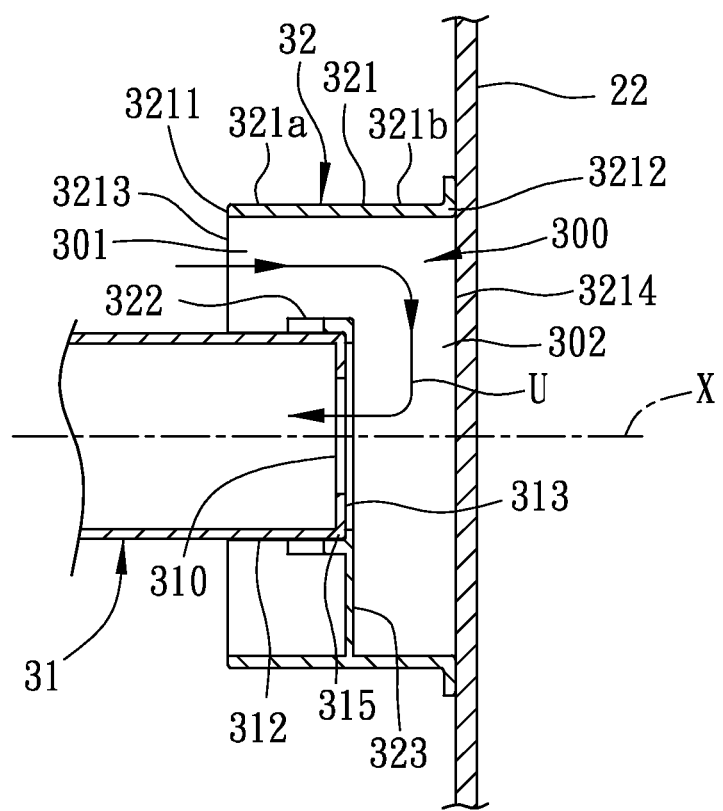
FIG. 7 is a fragmentary sectional view of the preferred embodiment.

The flow-guiding member 32 is disposed between the front and rear fender portions 23, 24 at a left side of the shell body 20 and is disposed above the left and right footrest portions 28 (see FIG. 2). The flow-guiding member 32 is connected to the inlet end portion 312 of the air intake duct 31, and has an outer surrounding wall 321, a sleeve wall 322 and an interconnecting wall 323 (see FIGS. 6 and 7). The sleeve wall 322 is surrounded by the outer surrounding wall 321, and is sleeved on the inlet end portion 312 of the air intake duct 31. The interconnecting wall 323 is disposed between and interconnects the outer surrounding wall 321 and the sleeve wall 322.

The outer surrounding wall 321 extends in the axial direction (X), defines a flow channel 300 in fluid communication with the inlet end opening 310, and has first and second end portions 321a, 321b (see FIG. 7) that extend in the axial direction (X) and that define first and second axial ends 3211, 3212 of the outer surrounding wall 321, respectively. The inlet end opening 310 is disposed between and is spaced apart from the first and second axial ends 3211, 3212 of the outer surrounding wall 321 in the axial direction (X). The first end portion 321a of the outer surrounding wall 321 surrounds the inlet end portion 312 of the air intake duct 31. The first axial end 3211 of the outer surrounding wall 321 defines a first end opening 3213 that is in fluid communication with the flow channel 300 and that opens in the axial direction (X). The second axial end 3212 of the outer surrounding wall 321 defines a second end opening 3214 in fluid communication with the flow channel 300, and contacts the side wall 22 of the shell body 20 so that the second end opening 3214 is closed by the side wall 22 (see FIG. 4). The second axial end 3212 of the outer surrounding wall 321 has an inclined end face inclined with respect to the axial direction (X) when viewed in a horizontal direction (H) (see FIG. 5) perpendicular to the axial direction (X).

In this embodiment, the flow channel 300 defines a generally L-shaped flow path that extends from the first end opening 3213 to the inlet end opening 310. The L-shaped flow path of the flow channel 300 cooperates with a flow path of the inlet end portion 312 of the air intake duct 31 to form a generally U-shaped flow path (U) (see FIG. 7). As such, water droplets carried by the flow of the environment air that is induced into the flow-guiding member 32 can collide with the side wall 22 of the shell body 20 and can lose momentum and then fall while the flow of the environment air makes turns along the U-shaped flow path (U), thereby effectively preventing water droplets from entering into the air intake duct 31. In addition, the end flange 313 disposed at the axial end 315 of the air intake duct 31 serves as a barrier for blocking accumulated water and water droplets in the flow-guiding member 32 from entering into the air intake duct 31.

Figure 8:
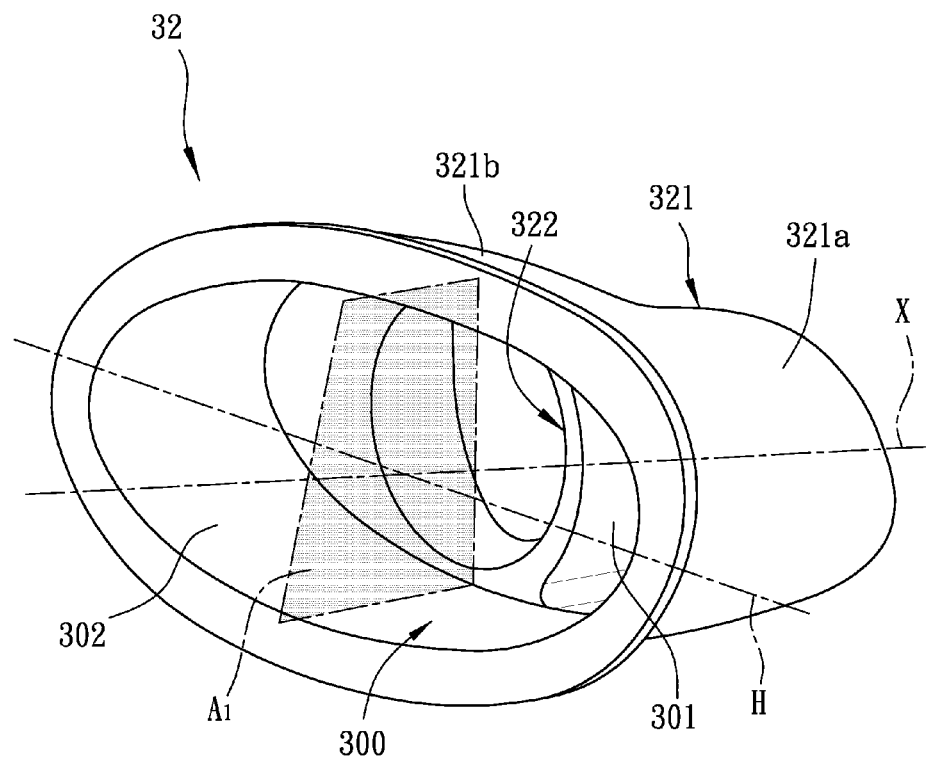
FIG. 8 is a perspective view of a flow-guiding member of the preferred embodiment.
Figure 9:
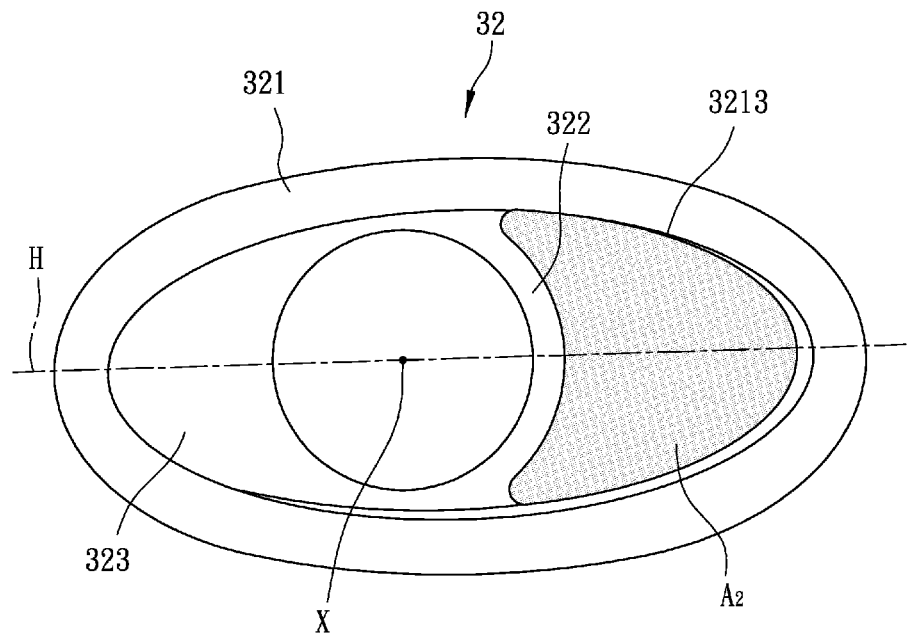
FIG. 9 is a front view of the flow-guiding member of the preferred embodiment.
Figure 10:
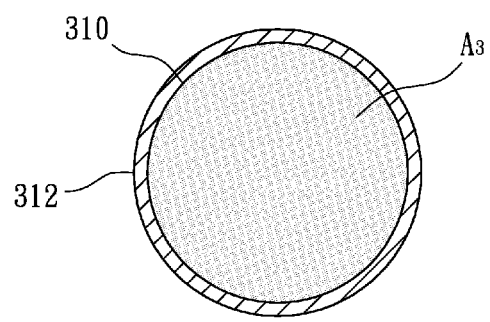
FIG. 10 is a rear sectional view of the flow-guiding member of the preferred embodiment.

The flow channel 300 has a first half 301 (see FIGS. 7 and 8) that is confined by the first end portion 321a of the outer surrounding wall 321, and a second half 302 that is confined by the second end portion 321b of the outer surrounding wall 321. In this embodiment, the outer surrounding wall 321 has an elliptical cross-section. As such, the second half 302 of the flow channel 300 has a variable vertical cross-sectional area (the shaded area shown in FIG. 8) along the horizontal direction (H) perpendicular to the axial direction (X). The variable vertical cross-sectional area has a maximum cross-sectional area ($A_1$) (see FIG. 8) that is less than the area ($A_2$) of the first end opening 3213 (the shaded area shown in FIG. 9) and that is greater than the area ($A_3$) of the inlet end opening 310 (the shaded area shown in FIG. 10) so that a sufficient amount of environment air induced into the air intake duct 31 through the flow-guiding member 32 can be ensured when the engine is actuated.

The sleeve wall 322 of the flow-guiding member 32 is formed with a guiding slot 331 that extends inwardly from an end of the sleeve wall 322 in the axial direction (X). The inlet end portion 312 of the air intake duct 31 is formed with an elongate protrusion 332 protruding from an outer surface of the inlet end portion 312. The elongate protrusion 332 is inserted into the guiding slot 331 and is guided by the guiding slot 331 so that the sleeve wall 322 can be easily sleeved on the inlet end portion 312 of the air intake duct 31 and that rotation of the flow-guiding member 32 relative to the air intake duct 31 is prevented.

The first and second interlocking members 341, 342 are provided on the inlet end portion 312 of the air intake duct 31 and the sleeve wall 322, respectively. The first and second interlocking member 341, 342 releasably engage each other so that the flow-guiding member 32 can be securely connected to the inlet end portion 312 of the air intake duct 31. In this embodiment, the first and second interlocking members 341, 342 engage each other in a tongue-and-groove engaging manner, and are in the form of an engaging groove formed in the sleeve wall 322 and an engaging tongue formed on the inlet end portion 312 of the air intake duct 31, respectively.

A cushion pad (not shown) can be provided on one of the side wall 22 of the shell body 20 and the second axial end 3212 of the outer surrounding wall 321 to abut against the other of the side wall 22 of the shell body 20 and the second axial end 3212 of the outer surrounding wall 321, thereby providing a sealing effect between the side wall 22 of the shell body 20 and the second axial end 3212 of the outer surrounding wall 321 and a cushioning effect on the flow-guiding member 32.

By making the first end portion 3211 of the outer surrounding wall 321 to surround the inlet end portion 312 of the air intake duct 31 and locating the first end opening 3213 of the first end portion 3211 at a position of the inlet end potion 312 that is spaced apart from the axial end 315 of the inlet end portion 312 along the axial direction (X), water droplets carried by the flow of the environment air induced into the flow-guiding member 32 can be effectively blocked from entering into the air intake duct 31.

While the present invention has been described in connection with what are considered the most practical and preferred embodiment, it is understood that this invention is not limited to the disclosed embodiments but is intended to cover various arrangements included within the spirit and scope of the broadest interpretation and equivalent arrangements.

What is claimed is:

1. A vehicle air intake mechanism adapted to be connected to an air filter of a vehicle, said vehicle air intake mechanism comprising:

an air intake duct adapted to be connected to the air filter and having an inlet end portion that defines an inlet end opening which opens in an axial direction; and a flow-guiding member connected to said inlet end portion of said air intake duct and having an outer surrounding wall that defines a flow channel in fluid communication with said inlet end opening, said outer surrounding wall having first and second end portions that extend in the axial direction and that define first and second axial ends of said outer surrounding wall, respectively, said first end portion of said outer surrounding wall surrounding said inlet end portion of said air intake duct, said first axial end of said outer surrounding wall defining a first end opening that is in fluid communication with said flow channel and that opens in the axial direction, said inlet end opening being disposed between and spaced apart from said first and second axial ends of said outer surrounding wall in the axial direction, said second axial end of said outer surrounding wall defining a second end opening that is in fluid communication with said flow channel and that is adapted to contact a side wall of a shell body of the vehicle so as to be closed by the side wall, wherein said flow-guiding member cooperates with said air intake duct to define a U-shaped flow path such that said inlet end opening of said air intake duct and said second end opening of said outer surrounding wall of said flow-guiding member open in a same direction, so that environmental air flows from said second end opening into said inlet end opening, wherein said flow channel has a first half that is confined by said first end portion of said outer surrounding wall, and a second half that is confined by said second end portion of said outer surrounding wall, said second half having a variable vertical cross-sectional area along a horizontal direction perpendicular to the axial direction, said variable vertical cross-sectional area having a maximum cross-sectional area that is less than an area of said first end opening, and wherein said maximum cross-sectional area of said variable vertical cross-sectional area is greater than an area of said inlet end opening.

2. The vehicle air intake mechanism of claim 1, wherein said flow-guiding member further has a sleeve wall and an interconnecting wall, said sleeve wall being surrounded by said outer surrounding wall and being sleeved on said inlet end portion of said air intake duct, said interconnecting wall being disposed between and interconnecting said outer surrounding wall and said sleeve wall.

3. The vehicle air intake mechanism of claim 2, wherein said sleeve wall is formed with a guiding slot, said inlet end portion of said air intake duct being formed with an elongate protrusion that is inserted into said guiding slot.

4. The vehicle air intake mechanism of claim 1, further comprising first and second interlocking members that are provided on said inlet end portion of said air intake duct and said sleeve wall, respectively, said first and second interlocking members releasably engaging each other.

5. The vehicle air intake mechanism of claim 4, wherein said first and second interlocking members engage each other in a tongue-and-groove engaging manner.

6. The vehicle air intake mechanism of claim 1, wherein said inlet end portion of said air intake duct has an axial end and an end flange that extends inwardly from said axial end of said inlet end portion.

* * * * *